C. ENGEL.
EDUCATIONAL APPLIANCE.
APPLICATION FILED AUG. 2, 1916.
1,204,854.
Patented Nov. 14, 1916.
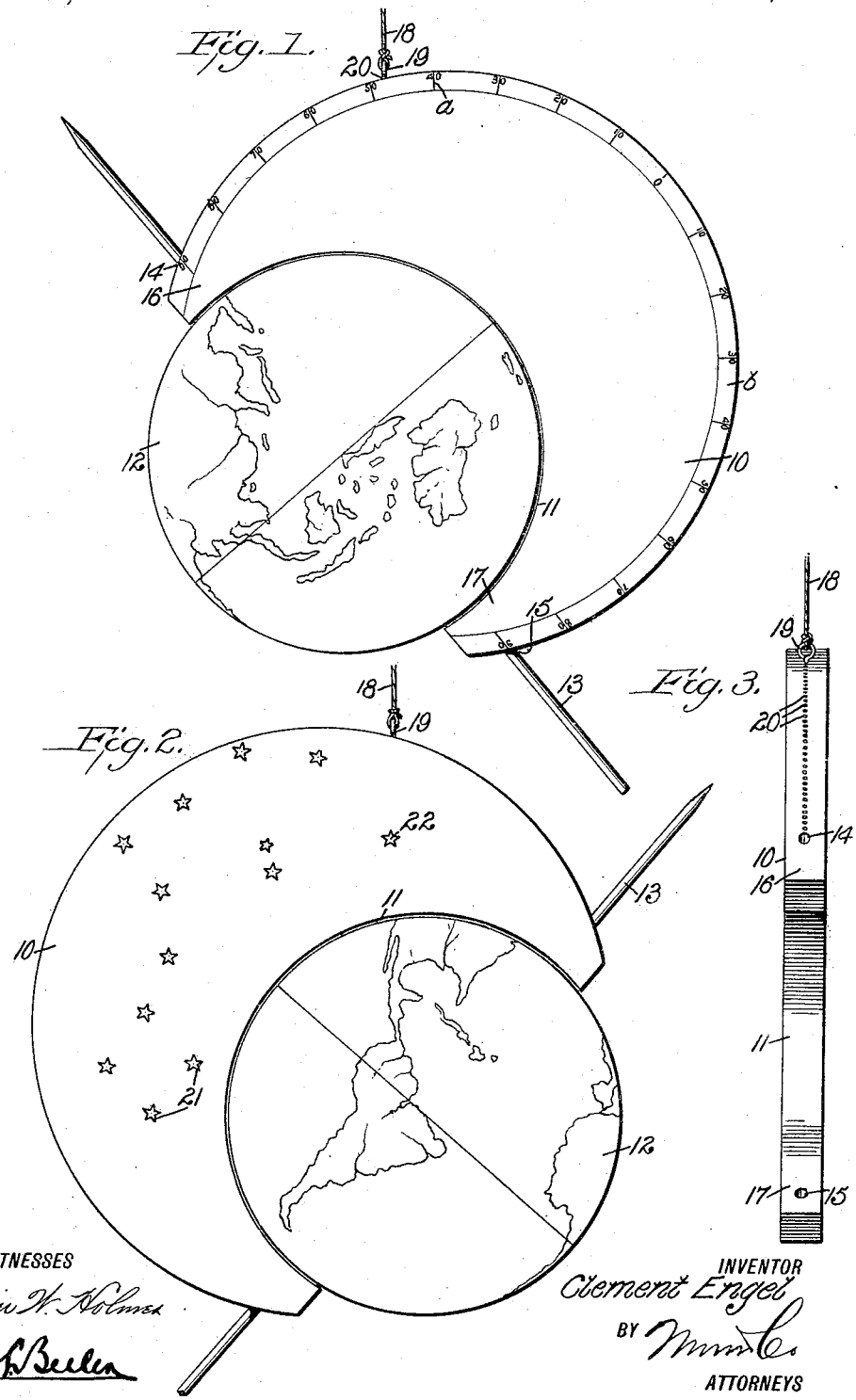
WITNESSES
INVENTOR
Clement Engel
BY
ATTORNEYS

UNITED STATES PATENT OFFICE.

CLEMENT ENGEL, OF NEW YORK, N. Y., ASSIGNOR OF ONE-HALF TO THEO OTTE, OF NEW YORK, N. Y.

EDUCATIONAL APPLIANCE.

1,204,854.   Specification of Letters Patent.   Patented Nov. 14, 1916.

Application filed August 2, 1916. Serial No. 112,654.

*To all whom it may concern:*

Be it known that I, CLEMENT ENGEL, a citizen of the United States, and a resident of the city of New York, borough of Manhattan, in the county and State of New York, have invented a new and Improved Educational Appliance, of which the following is a full, clear, and exact description.

This invention relates to educational appliances and has particular reference to means for illustrating and teaching certain astronomical facts.

Among the objects of the invention, therefore, is to provide a simple and easily manipulated apparatus for illustrating the relationship of the polar axis of the earth to the North Polar Star.

Another object of the invention is to indicate visually the inclination of the earth's axis according to the latitude of any particular place.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improvement; Fig. 2 is a similar view of the other side of the apparatus; and Fig. 3 is an edge view of the frame portion of the device looking toward the left in Fig. 2.

Referring now more particularly to the drawings, I show a frame 10 indicated as substantially of crescent shape and having its inner edge recessed at 11 to receive a globe 12 journaled for free rotation upon a polar axis 13 fitted in holes 14 and 15 in the end portions 16 and 17 respectively of the frame. The axis rod 13 is formed preferably of magnetic material and therefore constitutes virtually a magnetic needle which when undisturbed by air currents or other influences will point toward the north.

The sides of the frame 10 may be provided with suitable indicia. For example, on one side I provide two series of numerals extending in opposite directions from the median point opposite the equator of the globe around toward both the North and the South Poles. These scales are indicated at $a$ and $b$ and represent north and south latitude respectively. A suspension member 18 is adjustably connected to a screw eye 19 or its equivalent in any one of the series of holes 20 formed along the periphery of the frame according to the latitude of the place under consideration. In other words, as shown in Fig. 1, the suspension member is connected to indicate north latitude about 48 degrees, hence the inclination of the polar axis 13 is the same with respect to the horizontal. In other words, the parts are so arranged or proportioned that when the apparatus is suspended according to the latitude of any locality, the polar axis 13 will lie parallel to the true polar axis of the earth.

As indicated on the reverse side of the frame, I show a number of stars, some of which represent the Big Dipper with its pointers 21 pointing toward the North Star 22 along the line parallel to the axis 13.

From what is stated above and illustrated, it will be seen that I provide an educational appliance including a globe adapted for the usual purpose of a globe, but in addition thereto serving to indicate by a natural easily understood method the inclination of the earth's axis in any latitude. It serves also to illustrate the action of the magnetic needle and its relationship to the earth's polar axis.

I claim:

1. In an educational appliance, the combination of a frame, a magnetic axis rod projecting through the frame, a globe journaled for free rotation in the frame around the axis of said rod, and means to support the frame according to any desired latitude to cause the axis of the rod to point toward the North Star.

2. The herein described educational appliance comprising a frame, a magnetic axis rod projecting through the frame, a globe journaled in the frame for free rotation around said rod, the polar axis of the earth coinciding with the axis of the rod, and means to variably support the frame in any latitude to cause the polar axis aforesaid to automatically assume a position parallel to the true axis of the earth at such place.

3. The herein described educational device comprising a crescent shaped frame bearing along its periphery two series of graduations from zero to 90 degrees at each pole, a magnetic axis rod extending through the polar portions of the frame at right angles to a line passing through the zero point of the scales midway between the polar portions, a terrestrial globe journaled within the concavity of the frame for free rotation around the axis of said rod, the polar axis of the globe coinciding with the axis of the rod and said zero point of the scales lying opposite the equator of the globe, and suspending means for the frame adjustably connected to the periphery thereof opposite any desired degree of latitude as represented by the scales, whereby the magnetic axis rod will occupy a position parallel to the axis of the earth at the selected latitude.

4. In an educational appliance, the combination of a frame bearing a representation of the Big Dipper and the North Star, a magnetic axis rod extending through the frame parallel to the line of the pointers, a terrestrial globe journaled in the frame for free rotation around its polar axis around said rod, and means to support the frame in any latitude to automatically cause the axis rod to point toward the North Star.

CLEMENT ENGEL.

Copies of this patent may be obtained for five cents each, by addressing the "Commissioner of Patents, Washington, D. C."